United States Patent
Rekaya

(10) Patent No.: US 11,294,674 B2
(45) Date of Patent: Apr. 5, 2022

(54) DEVICES AND METHODS FOR PARALLELIZED RECURSIVE BLOCK DECODING

(71) Applicant: INSTITUT MINES-TELECOM, Palaiseau (FR)

(72) Inventor: Ghaya Rekaya, Antony (FR)

(73) Assignee: INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 17/297,994

(22) PCT Filed: Nov. 21, 2019

(86) PCT No.: PCT/EP2019/082026
§ 371 (c)(1),
(2) Date: May 27, 2021

(87) PCT Pub. No.: WO2020/114790
PCT Pub. Date: Jun. 11, 2020

(65) Prior Publication Data
US 2021/0397450 A1  Dec. 23, 2021

(30) Foreign Application Priority Data
Dec. 6, 2018  (EP) .................................. 18306628

(51) Int. Cl.
*G06F 9/30* (2018.01)
*G06F 9/46* (2006.01)

(52) U.S. Cl.
CPC ...... *G06F 9/30036* (2013.01); *G06F 9/30145* (2013.01); *G06F 9/463* (2013.01)

(58) Field of Classification Search
CPC ... G06F 9/30036; G06F 9/30145; G06F 9/463
See application file for complete search history.

(56) References Cited

U.S. PATENT DOCUMENTS

2017/0141788 A1* 5/2017 Khsiba ............... H04L 25/03242
2017/0187445 A1* 6/2017 Khsiba ..................... H04B 7/08
2017/0295037 A1* 10/2017 Mejri .................... H04L 1/0631

FOREIGN PATENT DOCUMENTS

EP  3 169 028 A1  5/2017
EP  3 229 429 A1  10/2017

OTHER PUBLICATIONS

Choi, et al., "Combined ML and DFE decoding for the V-BLAST system", IEEE International Conference on Communications, vol. 3, pp. 1243-1248, 2000.

(Continued)

*Primary Examiner* — Zachary K Huson
(74) *Attorney, Agent, or Firm* — BakerHostetler

(57) ABSTRACT

A decoder for determining an estimate of a vector of information symbols carried by a signal received through a transmission channel represented by a channel matrix is provided. The decoder includes a block division unit configured to divide the vector of information symbols into two or more sub-vectors, each sub-vector being associated with a block level; two or more processors configured to determine, in parallel, candidate sub-vectors and to store the candidate sub-vectors in a first stack. Each processor is configured to determine at least a candidate sub-vector by applying a symbol estimation algorithm and to store each candidate sub-vector with a decoding metric and the block level associated with the candidate sub-vector. The decoding metric is lower than or equal to a decoding metric threshold. A processor among the two or more processors is configured to determine at least a candidate vector from candidate sub-vectors stored in the first stack, the candidate vector being associated with a cumulated decoding metric and to update the decoding metric threshold from the cumulated decoding metric.

9 Claims, 3 Drawing Sheets

(56) References Cited

OTHER PUBLICATIONS

Srinath, et al., "Low ML-Decoding Complexity, Large Coding Gain, Full-Rate, Full-Diversity STBCs for 2×2 and 4×2 MIMO Systems", IEEE Journal of Selected Topics in Signal Processing, vol. 3, Issue 6, pp. 916-927, 2009.

Natarajan, et al., "On the Sphere Decoding Complexity of Gigh-Rate Multigroup Decodable STBCs in Asymmetric MIMO Systems", IEEE Transactions on Information Theory, vol. 59, Issue 9, pp. 5959-5965, 2013.

Ren, et al., "Fast-group-decodable space-time block code", Proceedings of IEEE Information Theory Workshop, pp. 1-5, Jan. 2010.

Khsiba, et al., "Semi-exhaustive reduced-complexity recursive block decoding for MIMO systems", 2016 23rd International Conference on Telecommunications (ICT), May 16, 2016.

\* cited by examiner

DEVICES AND METHODS FOR PARALLELIZED RECURSIVE BLOCK DECODING

CROSS-REFERENCE TO RELATED APPLICATIONS

This application is a National Stage of International patent application PCT/EP2019/082026, filed on Nov. 21, 2019, which claims priority to foreign European patent application No. EP 18306628.1, filed on Dec. 6, 2018, the disclosures of which are incorporated by reference in their entirety.

TECHNICAL FIELD

The invention generally relates to digital communication and in particular to methods and devices for decoding a data signal.

BACKGROUND

Multiple-Input Multiple-Output (MIMO) technologies are used in several communication systems to provide high transmission rates. MIMO systems exploit the space and time dimensions to encode and multiplex more data symbols using a multiplicity of transmit and/or receive antennas, over a plurality of time slots. As a result, the capacity, range, and reliability of a MIMO-based communication system can be enhanced. Exemplary MIMO communication systems comprise wired, wireless, and optical communication systems.

Space-Time diversity is achieved in MIMO systems using Space-Time coding. At transmitter devices, Space-Time encoders are implemented to encode data streams into codewords transmitted thereafter through the transmission channel. At receiver devices, Space-Time decoders are implemented to recover intended data streams conveyed by the transmitter device(s).

Several Space-Time decoding algorithms exist. The choice of the decoding algorithm to be used depends on the target performance and on the implementation complexity and related cost.

In the presence of equally distributed information symbols, optimal Space-Time decoders implement the Maximum Likelihood (ML) decoding criterion. Exemplary ML decoding algorithms comprise the exhaustive search and sequential decoding algorithms such as the Sphere decoder, the Schnorr-Euchner decoder, the Stack decoder, and the SB-Stack decoder. ML decoders provide optimal performance but require a high computational complexity that increases with the number of antennas and the size of the alphabet to which the information symbols belong.

Alternatively, sub-optimal decoding algorithms requiring lower computational complexity than ML decoders, can be used. Exemplary sub-optimal decoding algorithms comprise linear decoders such as the Zero-Forcing (ZF) and the Minimum Mean Square Error (MMSE) decoders and non-linear decoders such as the ZF-DFE decoder.

Both linear and non-linear decoders are based on inter-symbol interference cancellation and estimation of each information symbol individually.

According to another block decoding approach, the information symbols can be decoded by sub-vectors, i.e. by blocks of symbols. Decoding algorithms implementing block decoding are based on a division of the vector of information symbols into two or more sub-vectors. Each sub-vector is estimated individually and recursively, given the previously estimated sub-vectors of information symbols. The estimation of each sub-vector of symbols is performed using a symbol estimation algorithm (also referred to hereinafter as 'an estimation algorithm'). Any sequential, linear or non-linear decoding algorithm may be implemented in a given block as a symbol estimation algorithm to generate the estimate of the corresponding sub-vector of information symbols.

According to QR-based block decoding algorithms, the division of the vector of information symbols is made in accordance with a division of an upper triangular matrix representative of the transmission channel. The upper triangular matrix can be obtained by applying a QR decomposition to a channel matrix representative of the transmission channel.

A QR-based block decoding algorithm is disclosed in "W-J Choi, R. Negi, and J. M. Cioffi, Combined ML and DFE decoding for the V-BLAST system, IEEE International Conference on Communications, Volume 3, pages 1243-1248, 2000". A combination of ML and DFE decoding is therein proposed for wireless MIMO systems using spatial multiplexing of data streams. The vector of information symbols of length n is first divided into two sub-vectors of lengths p and n–p respectively. ML decoding is then used to determine an estimation of the sub-vector comprising p information symbols. Then, using decision feedback equalization, the remaining n-p symbols are estimated after an inter-symbol interference cancellation. The choice of the division parameters, i.e. the number of sub-vectors and the length of each sub-vector, is deterministic.

Other QR-based block decoding algorithms for coded wireless MIMO systems are disclosed for example in:

"K. Pavan Srinath and B. Sundar Rajan, Low ML-Decoding Complexity, Large Coding Gain, Full-Rate, Full-Diversity STBCs for 2×2 and 4×2 MIMO Systems, IEEE Journal of Selected Topics in Signal Processing, Volume 3, Issue 6, pages 916-927, 2009";

"L. P. Natarajan, K. P. Srinath, and B. Sundar Rajan, On The Sphere Decoding Complexity of Gigh-Rate Multigroup Decodable STBCs in Asymmetric MIMO Systems, IEEE Transactions on Information Theory, Volume 59, Issue 9, 2013"; and "T. P. Ren, Y. L. Guan, C. Yuen, and R. J. Shen. Fast-group-decodable space-time block code. In Proceedings of IEEE Information Theory Workshop, pages 1-5, January 2010".

According to an another QR-based block decoding approach, the estimate of the vector of information is based on an exhaustive search of candidate sub-vectors in association with each sub-vector of information symbols. According to this approach, the received signal is divided into two or more sub-vectors. For each sub-vector of information symbols, an exhaustive search is applied to enumerate all possible candidate sub-vectors representing an estimate of this sub-vector of information symbols. Using recursive interference cancellation, exhaustive lists of candidates are constructed by subtracting the interference due to the previously decoded sub-vectors in association with the blocks at lower level in the upper triangular matrix and by applying an ML or a ZF-DFE estimation algorithm. After deriving the lists of candidates for all the sub-vectors of information symbols, the solution corresponding to the candidate vector comprising the candidate sub-vectors associated with the smallest decoding metric is delivered as the estimation of the vector of information symbols.

The exhaustive search applied for the generation of the candidate sub-vectors in association with each sub-vector of information symbols requires a high computational complexity.

Recently, a QR-based block decoding algorithm termed 'semi-exhaustive recursive block decoder' has been proposed in the patent application No 15306808.5. The semi-exhaustive recursive block decoder provides a decoding solution inspired from the original exhaustive search-based recursive decoder. Accordingly, instead of performing an exhaustive search to enumerate all possible candidate estimates of each sub-vector of information symbols, the semi-exhaustive recursive block decoder uses for each sub-vector a radius as a threshold on the decoding metric of the candidate sub-vectors to be generated. Setting such thresholds enables reducing the number of candidate sub-vectors in the different lists. The selection of the radii thresholds for the different sub-vectors is performed according to a target diversity order. The semi-exhaustive recursive block decoder offers better decoding performance with a reduced decoding complexity compared with the original exhaustive search-based recursive block decoder.

Existing recursive block decoding algorithms provide better performance than linear and non-linear decoders. However, they still require an increased computational complexity compared with linear and non-linear decoders. There is accordingly a need for developing low-complexity and low-latency recursive block decoders.

SUMMARY

In order to address these and other problems, there is provided a decoder for determining an estimate of a vector of information symbols carried by a signal, the signal being received through a transmission channel represented by a channel matrix. The decoder comprises:

a block division unit configured to divide the vector of information symbols into two or more sub-vectors of information symbols in accordance with a division of the channel matrix into sub-matrices, each sub-vector being associated with a block level representing a level of the sub-vector in the channel matrix;

two or more processors configured to operate in parallel for determining candidate sub-vectors and storing the candidate sub-vectors in a first stack, each of the two or more processors being configured to determine at least a candidate sub-vector by applying a symbol estimation algorithm, a candidate sub-vector representing an estimate of a sub-vector of information symbols and to store the at least a candidate sub-vector of information symbols in the first stack with a decoding metric and the block level representing the level of the candidate sub-vector within the channel matrix. The decoding metric is lower than or equal to a decoding metric threshold. A processor among the two or more processors is configured to determine at least a candidate vector from candidate sub-vectors stored in the first stack, the candidate vector representing an estimate of the vector of information symbols and being associated with a cumulated decoding metric determined from the decoding metrics stored with the candidate sub-vectors and to update the decoding metric threshold from the cumulated decoding metric.

According to some embodiments, the two or more processors may comprise:

a first processor configured to determine one or more candidate sub-vectors in association with each sub-vector of information symbols by recursively applying an estimation algorithm starting from the sub-vectors of information symbols associated with the highest block level until reaching the sub-vector of information symbols associated with the lowest block level, the first processor being configured to store each candidate sub-vector in the first stack, and a second processor configured to determine one or more candidate sub-vectors by recursively selecting a sub-vector in the first stack associated with the lowest block level and determining a candidate sub-vector in association with each of the sub-vectors of information symbols that are associated with block levels lower than the lowest block level by applying a symbol estimation algorithm until reaching the lowest block level in the channel matrix. The second processor may be further configured to determine a candidate vector from the selected candidate sub-vector and the candidate sub-vectors determined in association with the sub-vectors of information symbols that are associated with block levels lower than the lowest block level, the candidate vector representing an estimate of said vector of information symbols, the second processor being further configured to determine a cumulated metric associated with the candidate vector by adding the decoding metrics associated with the selected candidate sub-vector and the decoding metrics associated with the candidate sub-vectors determined in association with the sub-vectors of information symbols that are associated with block levels lower than the lowest block level, the second processor being configured to store the candidate vector in a second stack with the cumulated decoding metric, the decoding metric threshold being updated to the cumulated decoding metric.

According to some embodiments, a processor among the two or more processors may be configured to:

order the first stack according to a given order of the decoding metrics associated with the candidate sub-vectors, update the decoding metric threshold to the cumulated decoding metric associated with the candidate vector, remove from the first stack the candidate sub-vectors that are associated with a decoding metric higher than the updated decoding metric threshold, and determine an estimate of a vector of information symbols from the candidate vector stored in the second stack that is associated with the lowest cumulated decoding metric.

According to some embodiments, the symbol estimation algorithm may be chosen in a group comprising a sequential lattice decoding algorithm, a Zero Forcing algorithm, a Minimum Mean Square Error algorithm, and a Zero Forcing Decision Feedback Equalizer.

According to some embodiments, the symbol estimation algorithm may comprise a preprocessing step using a lattice reduction algorithm and/or an MMSE-GDFE filtering.

According to some embodiments, the symbol estimation algorithm may be previously determined depending on a signal-to-noise ratio and/or on an outage capacity.

According to some embodiments, the symbol estimation algorithm may be previously determined depending on a target quality of service metric chosen in a group comprising a target achievable transmission rate.

According to some embodiments, the block division unit may be configured to divide the vector of information symbols according to a set of division parameters comprising a number of blocks at least equal to two and block lengths, the number of blocks representing the number of the sub-vectors of information symbols, a block length representing a number of information symbols comprised in a sub-vector of information symbols.

There is also provided a method for determining an estimate of a vector of information symbols carried by a signal, the signal being received through a transmission channel represented by a channel matrix. The method comprises:

dividing the vector of information symbols into two or more sub-vectors of information symbols in accordance with a division of the channel matrix into sub-matrices, each sub-vector being associated with a block level representing a level of said sub-vector in the channel matrix;

determining, by two or more processors operating in parallel, candidate sub-vectors and storing the candidate sub-vectors in a first stack, the step of determining candidate sub-vectors comprising:

determining, by each of the two or more processors, at least a candidate sub-vector by applying a symbol estimation algorithm, a candidate sub-vector representing an estimate of a sub-vector of information symbols and, storing the at least a candidate sub-vector of information symbols in the first stack with a decoding metric and the block level representing the level of the candidate sub-vector within the channel matrix, the decoding metric being lower than or equal to a decoding metric threshold, The method may further comprise determining at least a candidate vector from candidate sub-vectors stored in the first stack, the candidate vector representing an estimate of the vector of information symbols and being associated with a cumulated decoding metric determined from the decoding metrics stored with the candidate sub-vectors and updating the decoding metric threshold from the cumulated decoding metric.

Advantageously, the embodiments of the invention provide parallelized recursive block decoding techniques offering optimal decoding complexity with a reduced decoding latency and reduced computational complexity.

Further advantages of the present invention will become clear to the skilled person upon examination of the drawings and the detailed description.

BRIEF DESCRIPTION OF THE DRAWINGS

The accompanying drawings, which are incorporated in and constitute a part of this specification, illustrate various embodiments of the invention and, wherein.

DETAILED DESCRIPTION

Embodiments of the disclosure provide low-complexity and low-latency parallelized recursive block decoding devices and methods for decoding a signal carrying information symbols and received through a transmission channel with optimal diversity order and reduced decoding complexity and decoding delays. The transmission channel is represented by an upper triangular matrix obtained by applying a QR decomposition to a channel state matrix representative of the transmission channel.

Embodiments of the disclosure provide parallelized QR-based recursive decoding algorithms, the parallelization of the processing of the different blocks or sub-vectors of information symbols enables a drastic reduction of the decoding delays.

Devices and methods according to the various embodiments may be implemented in different types of systems. In particular, they may be implemented in communication systems to determine an estimate of a vector of information symbols conveyed from one or many transmitter devices to a receiver device.

The following description of some embodiments will be made with reference to communication systems, for illustration purposes only. However, the skilled person will readily understand that the various embodiments may be applied to other types of systems such as signal processing systems, cryptographic systems, and positioning systems.

Figure 1:
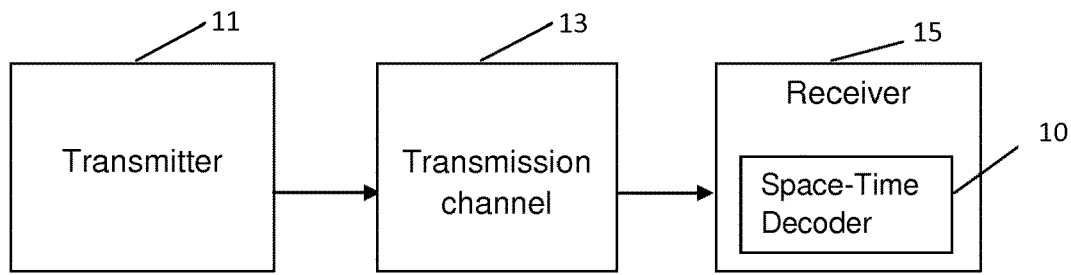
FIG. 1 is a block diagram of an exemplary application of the invention in a communication system, according to some embodiments.

FIG. 1 is a block diagram of an exemplary application to a communication system 100, according to some embodiments. The communication system 100 may be wired, wireless, or optical (e.g. optical fiber-based). The communication system 100 may comprise at least one transmitter device 11 (hereinafter referred to as a "transmitter") configured to transmit a plurality of information symbols to at least one receiver device 15 (hereinafter referred to as "receiver") through a transmission channel 13. The receiver 15 may include at a Space-Time decoder 10 to decode the information symbols sent by one or more transmitter devices 11. The transmission channel 13 may be any wired connection, wireless medium, or optical link.

In an application of the invention to radio communications, the communication system 100 may be a wireless single-user MIMO system comprising a wireless transmitter device 11 configured to communicate a flow of information symbols representing an input data and a wireless receiver device 15, configured to decode the conveyed symbols by the transmitter 11.

The transmitter device 11 may be equipped with one or more transmit antennas and the receiver device 15 may be equipped with one or more receive antennas, the number $n_t$ of transmit antennas the number $n_r$ of receive antennas being greater than or equal to one.

In another application of the invention to radio communications, the communication system 100 may be a wireless multi-user MIMO system in which a plurality of wireless transmitter devices 11 and receiver devices 15 communicate with each other. In such embodiments, the communication system 100 may further use, alone or in combination, any multiple access technique such as Time Division Multiple Access (TDMA), Frequency Division Multiple Access (FDMA), Code Division Multiple Access (CDMA), and Space-Division Multiple Access (SDMA).

In an application of the invention to optical communications, the communication system 100 may be an optical fiber-based communication system. The transmitter 11 and receiver 15 may be accordingly any optical transceiver capable of operating in optical fiber-based transmission systems. The transmission channel 13 may be any optical fiber link designed to carry data over short or long distances. Exemplary applications using optical fiber links over short distances comprise high-capacity networks such as data center interconnections. Exemplary applications using optical fiber links over long distances comprise terrestrial and transoceanic transmissions. In such embodiments, the information symbols conveyed by the transmitter 11 may be carried by optical signals polarized according to the different polarization states of the fiber. The optical signals propagate along the fiber-based transmission channel 11, according to one or more propagation modes, until reaching the receiver 15.

In another application of the invention to optical communications, the optical signal carrying the information symbols may be generated using a single wavelength lasers.

In other embodiments, wavelength division multiplexing (WDM) techniques may be used at the transmitter 11 to enable generating optical signals using a plurality of independent wavelengths.

In still another application of the invention to optical communication systems using multi-mode and/or multi-core fibers, space division multiplexing techniques may be used to multiplex the information symbols according to the various propagation modes.

Further, a multiple access technique such as WDMA (Wavelength Division Multiple Access) may be used in some applications of the invention to optical communication systems.

The transmission channel 13 may be any linear Additive White Gaussian Noise (AWGN) channel or a multipath channel using single-carrier or multi-carrier modulation formats such as OFDM (Orthogonal Frequency Division Multiplexing) and FBMC (Filter Bank Multi-Carrier) for mitigating frequency-selectivity, interference and delays.

In an application of the invention to wireless single-user MIMO systems, the tradeoff between complexity, performance, and decoding delays of QR-based sub-block decoding of a received signal may be optimized through an optimization of the sub-block division of the vector of information symbols taking into account the interference inter sub-vectors. Exemplary applications of the decoding methods and devices include, with no limitation, MIMO decoding in configurations that may be implemented in:

power-line wired communications standardized in the ITU G.hn and HomePlug AV2 specifications;

wireless standards such as the Wi-Fi (IEEE 802.11n and IEEE 802.11ac), the cellular WiMax (IEEE 802.16e), the cooperative WiMax (IEEE 802.16j), the Long Term Evolution (LTE), the LTE-advanced, and the 5G ongoing standardization.

For illustration purposes only, the following description will be made with reference to a wireless single-user MIMO system accommodating a transmitter device 11 equipped with $n_t \geq 1$ transmit antennas and a receiver device 15 equipped with $n_r \geq 1$ receive antennas for decoding information symbols sent by the transmitter 11. However, the skilled person will readily understand that embodiments of the invention apply to other communication systems such as wireless multi-user MIMO systems and optical MIMO systems. More generally, the invention may be applied to any communication system characterized by a linear representation (equivalently a lattice representation) of the channel output at receiver devices. In addition, although not limited to such embodiments, the invention has particular advantages in the presence of a number of transmit antennas greater than or equal to two $n_t \geq 2$) and/or a number of receive antennas greater than or equal to two ($n_r \geq 2$).

Figure 2:
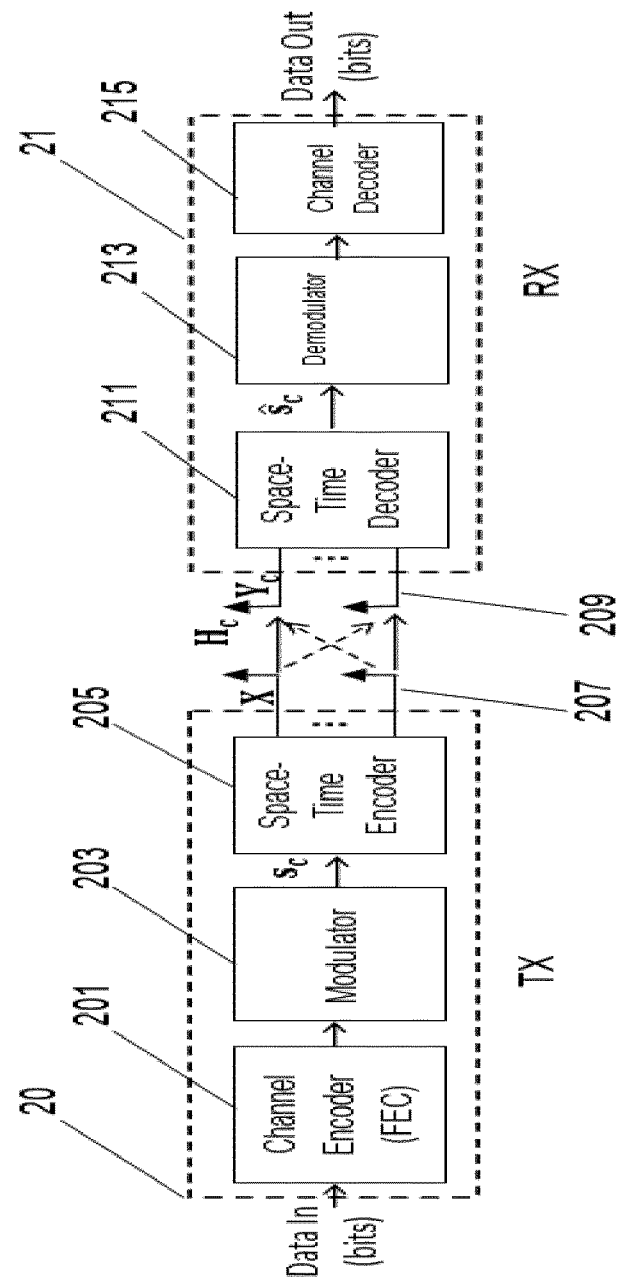
FIG. 2 is a block diagram of an exemplary application of the invention to wireless single-user MIMO systems, according to some embodiments.

Referring to FIG. 2, there is shown an exemplary wireless single-user MIMO communication system 200 in which various embodiments of the present invention may be implemented. The wireless single-user MIMO communication system 200 may comprise a transmitter 20 implementing a Space-Time Block Code (STBC) to multiplex the information symbols over time and space dimensions (i.e. over the transmit antennas). Each transmitter 20 of a station may exchange data with a receiver 21 of another station according to the wireless communication system 200.

The wireless single-user MIMO communication system 200 may present a symmetric configuration. As used herein, a symmetric configuration refers to a configuration in which the transmitter 20 and the receiver 21 are equipped with the same number of antennas $n_t = n_r$. Alternatively, the MIMO configuration may be asymmetric, the number $n_r$ of receive antennas differing from the number $n_t$ of transmit antennas. In particular, in one embodiment, in order to avoid a rank deficiency problem, the number $n_r$ of receive antennas may be larger than the number $n_t$ of antennas at the transmitter. Exemplary asymmetric MIMO configurations comprise 2×4 ($n_t=2$, $n_r=4$) and 4×8 ($n_t=4$, $n_r=8$) supported for example in the LTE standard.

The transmitter 20 may convey a signal to a receiver 21 over a noisy wireless MIMO channel represented by a channel matrix $H_c$. The transmitter 20 may be implemented in different devices or systems capable of operating in wireless environments. Exemplary devices adapted for such applications comprise mobile phones, drones, laptops, tablets, robots, IoT (Internet of Things) devices, base stations, etc. The transmitter 20 may be fixed or mobile. It may comprise for example:

a channel encoder 201 implementing one or more Forward Error Correction (FEC) codes such as linear block codes, convolutional codes, polar codes, etc;

a modulator 203 implementing a modulation scheme such as Quadrature Amplitude Modulation (QAM) delivering a modulated symbol vector $s_c$;

a Space-Time encoder 205 for delivering a codeword matrix X;

$n_t$ transmit antennas 207, each transmit antenna being associated with a single-carrier or a multi-carrier modulator such as an OFDM or an FBMC modulator.

The transmitter 20 may be configured to encode a received flow of information bits as data input using a FEC encoder 201 implementing for example a linear block code, a convolutional code, or a polar code. The encoded binary signal may be then modulated into a symbol vector $s_c$ using the modulator 203. Different modulation schemes may be implemented such as $2^q$-QAM or $2^q$-PSK with $2^q$ symbols or states. The modulated vector $s_c$ may be a complex-value vector comprising κ complex-value symbols $s_1, s_2, \ldots, s_K$ with q bits per symbol.

An information symbol $s_j$ has a mean power $E_s$, and can be written in the form:

$$s_j = \text{Re}(s_j) + i\, \text{Im}(s_j) \quad (1)$$

In equation (1), i denotes the complex number such that $i^2 = -1$ and the Re(.) and Im(.) operators output respectively the real and imaginary parts of an input value.

When modulation formats such as $2^q$-QAM are used, the $2^q$ symbols or states represent a sub-set of the integer field $\mathbb{Z}[i]$. The corresponding constellation is composed of $2^q$ points representing the different states or symbols. In addition, in the case of squared modulations, the real and imaginary parts of the information symbols belong to the same finite alphabet A=[−(q−1), (q−1)]. The minimum distance $d_{min}$ of a modulation scheme represents the Euclidean distance between two adjacent points in the constellation and is equal to 2 in such example.

A Space-Time Encoder 205 may be used to generate a codeword matrix X from the encoded symbols. The Space-Time Encoder 205 may use a linear STBC of length T and may deliver a codeword matrix X of dimension $n_t \times T$ that belongs to a codebook C and is sent over T time slots. The coding rate of such codes is equal to $\kappa/T$ complex symbols per channel use, where $\kappa$ is the number of encoded complex-value symbols composing the vector $s_c=[s_1, s_2, \ldots, s_K]^t$ of dimension $\kappa$ in this case. When full-rate codes are used, the Space-Time Encoder 205 encodes $\kappa=n_tT$ complex-value symbols. Examples of STBCs are the Perfect Codes. The Perfect Codes provide full coding rates by encoding a number $\kappa=n_t^2$ ($T=n_t$) of complex information symbols and satisfy a non-vanishing determinant property.

In some embodiments, the Space-Time Encoder 205 may use a spatial multiplexing scheme known as V-BLAST scheme by multiplexing the received complex-value information symbols over the different transmit antennas, without performing a coding in the time dimension.

The codeword thus constructed may be converted from the time domain to the frequency domain using a multicarrier modulation technique, using for example OFDM or FBMC modulators, and spread over the transmit antennas 207. Signals may be sent from the transmit antennas 207 after optional filtering, frequency transposition and amplification.

The receiver 21 may be configured to receive and decode a signal communicated by the transmitter 20 in a wireless network through a transmission channel (also referred to as a "communication channel") subject to fading and interference and represented by a complex-value channel matrixes $H_c$. In addition, the communication channel may be noisy, affected for example by a Gaussian Noise.

The receiver 21 may be integrated in a base station such as a Node-B in a cellular network, an access point in a local area network or ad-hoc networks or any other interfacing device operating in a wireless environment. The receiver 21 may be fixed or mobile. In one exemplary embodiment, the receiver 21 may comprise:
  a Space-Time decoder 211 configured to deliver, from the channel matrix $H_c$ and the channel output signal $Y_c$, an estimation $\hat{s}_c$ of the modulated symbol vector $s_c$;
  a demodulator 213 configured to generate a binary sequence by performing a demodulation of the estimated symbol vector $\hat{s}_c$;
  a channel decoder 215 configured to deliver, as an output, a binary signal which is an estimation of the transmitted bits, using for example the Viterbi algorithm.

The receiver 21 implements a reverse processing of the processing performed by the transmitter 20. Accordingly, if a single-carrier modulation is used at the transmitter rather than a multi-carrier modulation, then the $n_r$ OFDM of FBMC demodulators may be replaced by corresponding single-carrier demodulators.

Figure 3:
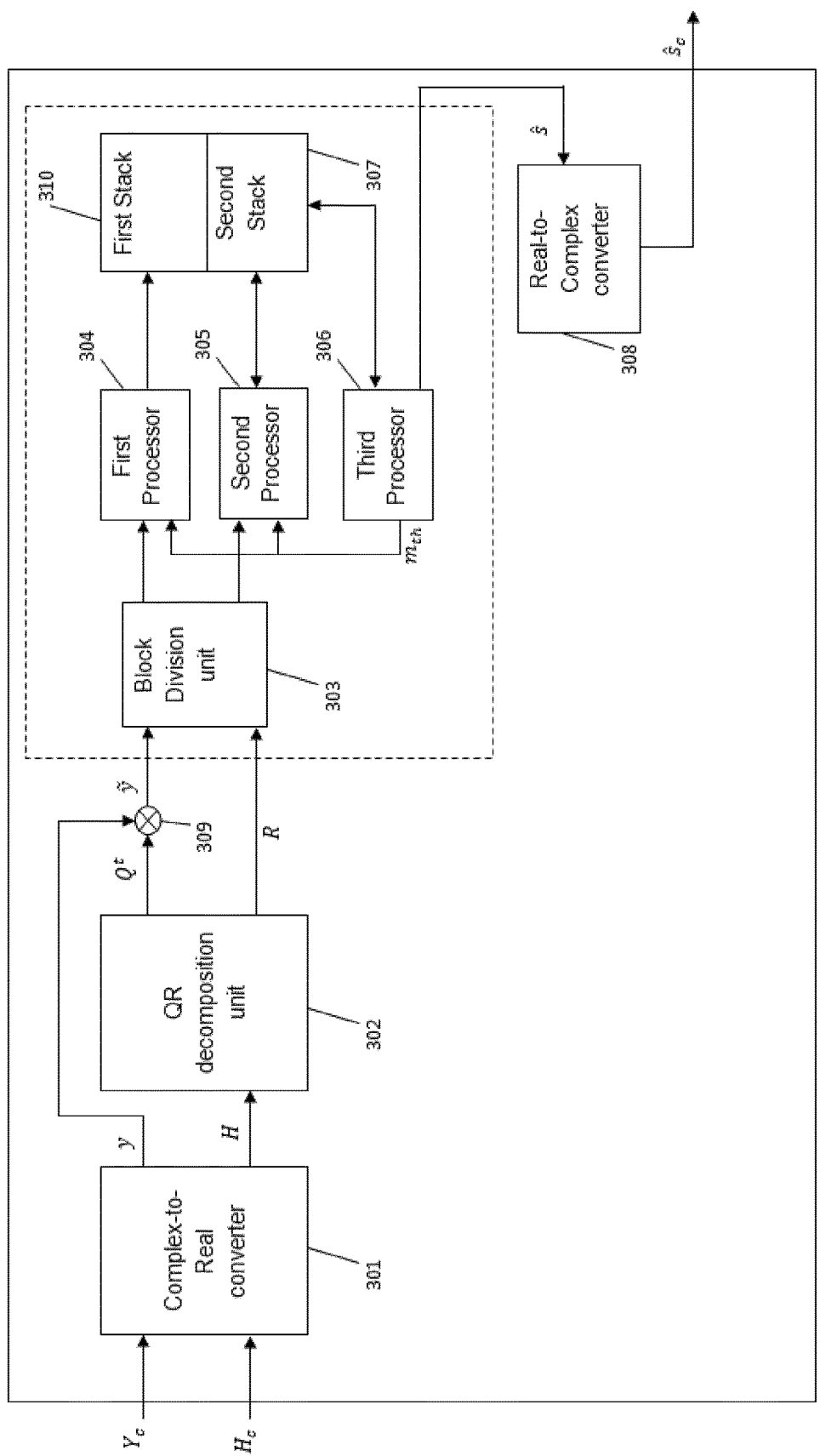
FIG. 3 is a block diagram representing the structure of a Space-Time decoder, according to some embodiments in which parallelized recursive block decoding is used.

FIG. 3 represents a block structure of a Space-Time decoder 300 (also referred to as 'a decoder') according to some embodiments in application to a wireless Rayleigh fading multiple antenna system, the decoder 300 being configured to receive and decode a signal sent from a transmitter equipped with $n_t$ transmit antennas, the decoder 300 being implemented in a receiver device equipped with $n_r$ receive antennas.

According to some embodiments in which Space-Time encoding has been performed at the transmitter using a Space-Time code of length T encoding $\kappa$ symbols, the received complex-value signal may be written in the form:

$$Y_c = H_c X_c + W_c \quad (2)$$

In equation (2), $Y_c$ is a $n_r \times T$ matrix representing the received signal, $X_c$ denotes the complex-value codeword matrix of dimensions $n_t \times T$.

According to some embodiments in which V-BLAST spatial multiplexing is used, the received complex-value signal may be written in the form:

$$y_c = H_c s_c + w_c \quad (3)$$

In equation (3), $y_c$ is a $n_r$-dimensional vector, $s_c$ denotes the complex-value vector of transmitted information symbols of dimension $n_t$.

The complex-value $n_r \times n_t$ matrix $H_c$ in equations (2) and (3) represents the channel matrix comprising the fading gains. In a Rayleigh fading channel, the entries of the channel matrix $H_c$ are of independent identically distributed (i.i.d) complex Gaussian-type. The channel matrix may be estimated in coherent transmissions at the receiver using estimation techniques such as least square estimators. In addition to the multipath fading effects, the transmission channel may be noisy. The noise may result from the thermal noise of the system components, inter-user interference and intercepted interfering radiation by antennas. The total noise may be modeled by a zero-mean Additive White Gaussian Noise of variance $\sigma^2$ per real-value dimension modeled in equations (2) and (3) respectively by the $n_r \times T$ complex-value matrix $W_c$ and the $n_r$-dimensional complex-value vector $w_c$.

The decoder may comprise a complex-to-real converter 301 configured to convert the complex-value channel matrix $H_c$ into a real-value equivalent channel matrix H, and convert the complex-value received signal into a real-value signal.

In one embodiment using a V-BLAST spatial multiplexing, the complex-to-real converter 301 may be configured to transform the system in equation (3) into:

$$y = \begin{bmatrix} \mathrm{Re}(y_c) \\ \mathrm{Im}(y_c) \end{bmatrix} = \begin{bmatrix} \mathrm{Re}(H_c) & -\mathrm{Im}(H_c) \\ \mathrm{Im}(H_c) & \mathrm{Re}(H_c) \end{bmatrix} \begin{bmatrix} \mathrm{Re}(s_c) \\ \mathrm{Im}(s_c) \end{bmatrix} + \begin{bmatrix} \mathrm{Re}(w_c) \\ \mathrm{Im}(w_c) \end{bmatrix} \quad (4)$$

The Re(.) and Im(.) operators in equation (4) designate the real and imaginary parts of each element composing the underlying vector or matrix. The complex-to-real conversion may be performed considering an arbitrary order of the elements of the vectors and is not limited to the exemplary conversion expressed in equation (4).

In another embodiments using linear Space-Time block coding at the transmitter, the complex-to-real converter 301 may be configured to transform the system in equation (2) into a real-value system that can be written in the linear representation form of equation (4) where the equivalent channel matrix is the real-value $2n_rT \times 2\kappa$ matrix $H_{eq}$ given by:

$$H_{eq} = (I_T \otimes H)G \quad (5)$$

The $2n_rT \times 2\kappa$ matrix G designates a real-value matrix known as a generator matrix or coding matrix of the linear Space-Time Block code used at the transmitter. $I_T$ denotes the identity matrix of dimension T and the operator $\otimes$ is the Kronecker matrices product.

To facilitate the understanding of the following embodiments, the following description will be made with reference to a spatial multiplexing scheme and involving a symmetric MIMO configuration where the transmitter and receiver are equipped with the same number of antennas $n_t=n_r$, for illustration purposes only. Accordingly, the real-value system in equation (3) can be written in the linear form as:

$$y=Hs+w \quad (6)$$

In equation (6), the vectors y, s and w are n-dimensional vectors with $n=2n_t=2n_r$ and the equivalent real-value channel matrix H is a square n×n matrix. The vector s comprises the real and imaginary parts of the original complex-value information symbols comprised in the vector $s_c$.

The decoder 300 may comprise a QR decomposition unit 302 configured to generate an orthogonal matrix Q and an upper triangular matrix R by applying a QR decomposition to the real-value channel matrix such that H=QR. The components of the upper triangular matrix are denoted by $R_{ij}$ with i,j=1, ..., n.

The decoder 300 may further comprise a multiplication unit 309 configured to determine an auxiliary signal $\tilde{y}$ by scaling the real-value signal y by the transpose of the orthogonal matrix Q obtained from the QR decomposition of the real-value channel matrix such that:

$$\tilde{y}=Q^t y=R\cdot s+\tilde{w} \quad (7)$$

In equation (7), $\tilde{w}=Q^t w$ designates a scaled noise vector. Given the orthogonality of the matrix Q, the system in equation (7) is equivalent to the one given in equation (6).

The parallelized QR-based recursive block decoding according to the various embodiments is based on the real-value system of equation (7).

ML decoding of the information symbols can be formalized by the optimization problem given by:

$$\hat{s}_{ML}=\text{argmin}_{s\in A^n}\|\tilde{y}-Rs\|^2 \quad (8)$$

In equation (8), A designates the alphabet to which the real and imaginary parts of the complex-value vector $s_c$ composing the real vector s belong. An ML metric maybe defined in relation with the ML decoding problem as:

$$m(s)=\|\tilde{y}-Rs\|^2 \quad (9)$$

Recursive block decoding according to the embodiments of the disclosure is based on a division of the vector of information symbols into two or more sub-vectors in accordance with a division of the upper triangular matrix into a plurality of sub-matrices.

Accordingly, the decoder 300 may further comprise a block division unit 303 configured to perform vectors and matrix division according to a set of division parameters comprising a number of blocks at least equal to two denoted by N≥2 and block lengths denoted by $l_k$ with k=1, ..., N such that the length $l_k \geq 1$ corresponds to the length in terms of the number of elements/entries of the $k^{th}$ sub-vector of information symbols, the length being higher than or equal to one, i.e. each sub-vector of information symbols comprises one or more symbols. The lengths of the blocks satisfy the equality given by $\sum_{k=1}^{N} l_k = n$.

Using the set of division parameters, the block division unit 303 may be configured to divide the vector $\tilde{y}$ into N sub-vectors such that $$\tilde{y}=\begin{bmatrix}\tilde{y}^{(1)}\\ \vdots \\ \tilde{y}^{(N)}\end{bmatrix},$$

sub-vector $\tilde{y}^{(k)}$ of index k, for k=1, ..., N has a lengths $l_k$. Similarly, the block division unit 303 may be configured to divide the real-value vector of information symbols s and to the noise vector $\tilde{w}$ respectively into N sub-vectors $s^{(k)}$ and N sub-vectors $\tilde{w}^{(k)}$ of lengths $l_k$ such that $$s=\begin{bmatrix}s^{(1)}\\ \vdots \\ s^{(N)}\end{bmatrix} \text{ and } \tilde{w}=\begin{bmatrix}\tilde{w}^{(1)}\\ \vdots \\ \tilde{w}^{(N)}\end{bmatrix}.$$

The division of the vectors $\tilde{y}$, s and $\tilde{w}$ may be performed in accordance with a division of the upper triangular matrix R into sub-matrices according to $$R=\begin{bmatrix}R_{11} & \cdots & R_{1,n-1} & R_{1n}\\ 0 & \vdots & \vdots & \vdots \\ 0 & 0 & R_{n-1,n-1} & R_{n-1,n}\\ 0 & 0 & 0 & R_{nn}\end{bmatrix}=\begin{bmatrix}R^{(1)} & \cdots & B^{(1N-1)} & B^{(1N)}\\ 0 & \cdots & \vdots & \vdots \\ 0 & 0 & R^{(N-1)} & B^{(N-1N)}\\ 0 & 0 & 0 & R^{(N)}\end{bmatrix} \quad (10)$$

In equation (10):
a square upper triangular sub-matrix $R^{(k)}$ is of dimension $l_k \times l_k$; and
a sub-matrix $B^{(kj)}$ is a rectangular matrix of dimensions $l_k \times l_j$ for j=k+1, ..., N and represents the interference between the sub-vectors $s^{(k)}$ and $s^{(j)}$.

According to some embodiments, the block division unit 303 may be configured to previously determine the set of division parameters depending on the zero structure of the upper triangular matrix R such that the set of division parameters provides a division of the upper triangular matrix into sub-matrices that exploit the zero structure of the rectangular sub-matrices to reduce the error propagation due to the interference between the sub-vectors. Indeed, as the sub-matrix $B^{(kj)}$ represents the interference between the sub-vectors $s^{(k)}$ and $s^{(j)}$, the decoding of the sub-vector $s^{(k)}$ depends on the determined estimates on the sub-vectors $s^{(j)}$ for j=k+1, ..., N. Any error on the estimation of the sub-vector $s^{(j)}$ may induce an error on the estimation of the sub-vector $s^{(k)}$. The error propagation due to the interference between the sub-vectors $s^{(k)}$ and $s^{(j)}$ for j=k+1, ..., N depends on the zero structure of the rectangular sub-matrix $B^{(kj)}$. The lower the number of zeros in the rectangular sub-matrices, the lower the error propagation, and the better the decoding error performances.

Accordingly, the block division unit 303 may be configured to previously determine the set of division parameters enabling, for a given upper channel matrix, a minimization of the impact of the interference between the sub-vectors of information symbols. The set of division parameters may be determined based on the optimization (minimization or maximization) of a division metric representing the zero structure of the rectangular sub-matrices.

Given the set of division parameters, the divided sub-matrices $R^{(k)}$ and $B^{(kj)}$ of the upper triangular matrix R and the divided sub-vectors $\tilde{y}^{(k)}$ may be grouped into N blocks $(SB)_k$ with k=1, ..., N.

A block $(SB)_k$, for k=1, ..., N−1, may be defined by a set of parameters such that $(SB)_k=\{l_k, s^{(k)}, R^{(k)}, \tilde{y}^{(k)}, \hat{y}^{(k)}, \tilde{w}^{(k)}, D^{(k)}, B^{(kj)}, j=k+1, ..., N\}$, where:

$$\tilde{y}^{(k)}=R^{(k)} s^{(k)}+\sum_{j=k+1}^{N} B^{(kj)} s^{(j)}+\tilde{w}^{(k)} \quad (11)$$

$$\hat{y}^{(k)}=\tilde{y}^{(k)}-\sum_{j=k+1}^{N} B^{(kj)} \hat{s}^{(j)} \quad (12)$$

For k=N, the block of index N may be defined by $(SB)_N = \{l_N, s^{(N)}, R^{(N)}, \tilde{y}^{(N)}, \tilde{w}^{(N)}, D^{(N)}\}$ such that:

$$\tilde{y}^{(N)} = R^{(N)} s^{(N)} + \tilde{w}^{(N)} \quad (13)$$

$D^{(k)}$ designates a symbol estimation algorithm applied in the $k^{th}$ block to determine a candidate estimate of the sub-vector of information symbols $s^{(k)}$.

According to such groups, the ML decoding metric in equation (9) may be written as:

$$m(s) = \|\tilde{y} - Rs\|^2 = \|\Sigma_{k=1}^N \tilde{y}^{(k)} - (R^{(k)} s^{(k)} + \Sigma_{j=k+1}^N B^{(kj)} s^{(j)})\|^2 \quad (14)$$

Accordingly, the ML optimization system of equation (8) can be expressed as:

$$\hat{s} = \arg\min_{s^{(k)} \in \mathcal{A}^{l_k}} \left\| \sum_{k=1}^N \tilde{y}^{(k)} - \left( R^{(k)} s^{(k)} + \sum_{j=k+1}^N B^{(kj)} s^{(j)} \right) \right\|^2 \quad (15)$$

In equation (15), $\mathcal{A}^{l_k}$ designates the alphabet to which belongs to sub-vector of information symbols $s^{(k)}$.

Parallelized recursive block decoding according to the embodiments of the disclosure is based on a parallelized determination of sets of candidate sub-vectors denoted by $\Gamma_1, \ldots, \Gamma_N$, such that the set $\Gamma_k$ comprises one or more candidate sub-vectors $\hat{s}_1^{(k)}, \ldots, \hat{s}_{Card(\Gamma_k)}^{(k)}$ of the $k^{th}$ sub-vector of information symbol $s^{(k)}$, with $Card(\Gamma_k)$ designating the cardinality of the set $\Gamma_k$ strictly inferior to the cardinality of the alphabet A to which belong the real and imaginary parts of the complex-value vector of information symbols. Accordingly, the sets of candidate sub-vectors may be determined in parallel using two or more processors (also referred to 'processing units') enabling a faster decoding and a lower decoding complexity. The two or more processors may be configured to operate in parallel for determining candidate sub-vectors and storing the candidate sub-vectors in a first stack 310, each processor being configured to determine at least a candidate sub-vector by applying a symbol estimation algorithm, a candidate sub-vector representing an estimate of a sub-vector of information symbols. Each processor may be further configured to store each determined candidate sub-vector in the first stack 310 with a decoding metric associated with the candidate sub-vector and the block level representing the level of the candidate sub-vector with the upper triangular channel matrix. A processor among the two or more processors may be configured to determine at least a candidate vector from candidate sub-vectors stored in the first stack 310, the candidate vector representing an estimate of the vector of information symbols and being associated with a cumulated decoding metric determined from the decoding metrics stored with the candidate sub-vectors and to update the decoding metric threshold from the cumulated decoding metric.

According to some embodiments, the decoder 300 may comprise, among the two or more processors, a first processor 304 and a second processor 305 configured to operate in parallel for filling a first stack 310 with candidate sub-vectors $\hat{s}_1^{(k)}, \ldots, \hat{s}_{Card(\Gamma_k)}^{(k)}$ for k taking value between 1 and N, a candidate sub-vector $\hat{s}_{t_k}^{(k)}$ for $t_k = 1, \ldots, Card(\Gamma_k)$ representing an estimate of the sub-vector of information symbols $s^{(k)}$.

A candidate sub-vector $\hat{s}_{t_k}^{(k)}$ stored in the first stack 310 may be associated with a decoding metric defined by:

$$m(\hat{s}_{t_k}^{(k)}) = \|\tilde{y}^{(k)} - (R^{(k)} \hat{s}_{t_k}^{(k)} + \Sigma_{j=k+1}^N B^{(kj)} \hat{s}_{t_j}^{(j)})\|^2 \quad (16)$$

In equation (16), the term $B^{(kj)} \hat{s}_{t_j}^{(j)}$ corresponds to inter-symbol interference, the candidate sub-vector $\hat{s}_{t_j}^{(j)}$ for j=k+1, ..., N being known from the previously determined candidate sub-vectors in the sets $\Gamma_j$ for j=k+1, ..., N.

A candidate sub-vector $\hat{s}_{t_k}^{(k)}$ may be determined by applying the symbol estimation algorithm $D^{(k)}$ associated with the $k^{th}$ block according to the satisfaction of a decoding metric condition according to which the decoding metric $m(\hat{s}_{t_k}^{(k)})$ associated with a candidate sub-vector is required to be lower than or equal to a decoding metric threshold denoted by $m_{th}$ such that $m(\hat{s}_{t_k}^{(k)}) \leq m_{th}$.

The candidate sub-vector $\hat{s}_{t_k}^{(k)}$ stored in the first stack 310 may be further associated with a block level representing the level of the sub-vector within the upper triangular channel matrix. Using the block division notation, the block level associated with the candidate sub-vector $\hat{s}_{t_k}^{(k)}$ is the index k.

The parallelized recursive block decoding according to the embodiments of the disclosure provides a parallelized processing of the different blocks such that the candidate sub-vectors corresponding to the different sub-vectors of information symbols are determined in parallel enabling a faster delivery of a complete vector candidate $\hat{s}$ on the vector of information symbols. Moreover, the parallelized processing of the different blocks enables updating the decoding metric threshold to be respected during the estimation of the candidate sub-vectors, the decoding metric threshold being updated each time a global solution or estimate $\hat{s}$ on the vector of information symbols s is determined once a candidate sub-vector is determined for each of the sub-vectors.

The parallelized recursive block decoding starts with the processing of the last block $(SB)_N$ of block level equal to N for the determination of at least one candidate sub-vector $\hat{s}_1^{(N)}$ estimate of the $N^{th}$ sub-vector of information symbols $s^{(N)}$ by applying a symbol estimation algorithm $D^{(N)}$ according to the satisfaction of the decoding condition on the decoding metric. Once a first candidate sub-vector $\hat{s}_1^{(N)}$ is determined, the processing of the remaining blocks $(SB)_k$ for k=N-1, ..., 1 may be started. Multiple processors may be implemented to simultaneously process the different blocks $(SB)_k$ for determining candidate sub-vectors $\hat{s}_{t_k}^{(k)}$ in the sets $\Gamma_k$ for k=N-1, ..., 1.

Accordingly, the first processor 304 may be configured to determine one or more candidate sub-vectors in association with each sub-vector of information symbols by recursively applying an estimation algorithm starting from the sub-vectors of information symbols associated with the highest block level until reaching the sub-vector of information symbols associated with the lowest block level. This means that the first processor 304 may be configured to start with processing the $N^{th}$ block $(SB)_N$, the processing consisting in applying the symbol estimation algorithm $D^{(N)}$ to determine one or more sub-vector estimates $\hat{s}_{t_N}^{(N)}$ in the set $\Gamma_N$ with $t_N$ designating the index of the sub-vector estimate $\hat{s}_{t_N}^{(N)}$ taking value between 1 and Card $(\Gamma_N)$. Each time the first processor 304 determines a sub-vector estimate $\hat{s}_{N_k}^{(N)}$, the first processor 304 stores the found sub-vector estimate $\hat{s}_{t_N}^{(N)}$ in the first stack 310 together with the corresponding block level equal to N for the first processed block, and the decoding metric $m(\hat{s}_{t_N}^{(N)})$. After finding a first sub-vector estimate $\hat{s}_1^{(N)}$, the first processor 304 continues the estimation process for determining all candidate sub-vectors corresponding to the set $\Gamma_N$. Once the first processor 304 terminates processing the $N^{th}$ block $(SB)_N$, it moves up with respect to the levels of the sub-vectors of information symbols in order to process the $(N-1)^{th}$ block $(SB)_{N-1}$. The processing of the $(N-1)^{th}$ block $(SB)_{N-1}$ consists in determining, for each candidate sub-vector $\hat{s}_N^{(N)}$ determined in the set $\Gamma_N$, a candidate sub-vector $\hat{s}_{N-1}^{(N-1)}(\hat{s}_{t_N}^{(N)})$ in the set. The first processor 304 may be configured to determine each candidate sub-vector $\hat{s}_{N-1}^{(N-1)}(\hat{s}_{t_N}^{(N)})$ by:

performing interference cancellation and determining the sub-vector $\tilde{y}^{(k)} = R^{(k)}s^{(k)} + \sum_{j=k+1}^{N} B^{(k,j)}\hat{s}_{t_j}^{(j)} + \tilde{w}^{(k)}$;

applying a symbol estimation algorithm $D^{(N-1)}$ to determine a candidate sub-vector $\hat{s}_{t_{N-1}}^{(N-1)}(\hat{s}_{t_N}^{(N)})$ satisfying the metric condition $m(\hat{s}_{t_{N-1}}^{(N-1)}(\hat{s}_{t_N}^{(N)})) \leq m_{th}$.

According to some embodiments, the decoding metric threshold $m_{th}$ may be initially set (for example by the first processor 304) to the Euclidean distance between the received signal and the ZF-DFE estimate determined by applying a Zero Forcing Decision Feedback Equalizer to the received signal.

Once the first processor ends with the processing of the $(N-1)^{th}$ block $(SB)_{N-1}$ it moves up for processing the $(N-2)^{th}$ block $(SB)_{N-2}$ and so on until reaching the first block $(SB)_1$. For a candidate sub-vector associated with a block level different from the highest block level equal to N, the first processor 304 may be configured to store the candidate sub-vector together with the candidate sub-vectors of the previously processed blocks that were used in the interference cancellation step to find said candidate sub-vector.

In parallel to the processing performed by the first processor 304, the second processor 305 may be configured to determine one or more candidate sub-vectors by recursively selecting a sub-vector in the stack associated with the lowest block level and determining a candidate sub-vector in association with each of the sub-vectors of information symbols that are associated with block levels lower than said lowest block level by applying an estimation algorithm until reaching the lowest block level in the channel matrix.

This means that once the first processor 304 determines a first candidate sub-vector $\hat{s}_1^{(N)}$ and stores it in the first stack 310, the second processor 305 is activated. At this time, the first stack 310 comprises only the candidate sub-vector $\hat{s}_1^{(N)}$, thus the lowest block level in this case corresponds to the block level N associated with the candidate sub-vector $\hat{s}_1^{(N)}$. The second processor 305 selects the candidate sub-vector $\hat{s}_1^{(N)}$ and moves up by processing each of the blocks $(SB)_k$ of block levels $k=N-1, \ldots, 1$ lower than the block level N associated with the selected candidate sub-vector $\hat{s}_1^{(N)}$. The second processor 305 may be configured to recursively determine a candidate sub-vector $\hat{s}_1^{(k)}$ when processing the $k^{th}$ block $(SB)_k$ by:

performing interference cancellation for determining the sub-vector $\tilde{y}^{(k)} = R^{(k)}s^{(k)} + \sum_{j=k+1}^{N} B^{(k,j)}\hat{s}_1^{(j)} + \tilde{w}^{(k)}$;

applying a symbol estimation algorithm $D^{(k)}$ for determining a candidate sub-vector $\hat{s}_1^{(k)}(\hat{s}_1^{(j)}, j=k'1, \ldots, N)$ satisfying the metric condition $m(\hat{s}_1^{(k)}(\hat{s}_1^{(j)}, j=k'1, \ldots, N)) \leq m_{th}$.

By processing the first block of block level $k=1$, the second processor 305 determines a candidate vector $\hat{s}=(\hat{s}_1^{(1)}, \hat{s}_1^{(2)}, \ldots, \hat{s}_1^{(N)})$ from the selected candidate sub-vector $\hat{s}_1^{(N)}$ and the candidate sub-vectors $\hat{s}_1^{(k)}$ determined in association with the sub-vectors of information symbols $s^{(k)}$ that are associated with block levels $k=N-1, \ldots, 1$ lower than the block level N associated with the selected candidate sub-vector $\hat{s}_1^{(N)}$. The candidate vector $\hat{s}$ represents an estimate of the vector of information symbols s. The second processor 305 may be configured to determine a cumulated metric $m(\hat{s})$ associated with the candidate vector by adding the decoding metric $m(\hat{s}_1^{(N)})$ associated with the selected candidate sub-vector $\hat{s}_1^{(N)}$ and the decoding metrics $m(\hat{s}_1^{(k)})$ for $k=1, \ldots, N-1$ associated with the candidate sub-vectors $\hat{s}_1^{(N-1)}, \hat{s}_1^{(N-2)}, \ldots, \hat{s}_1^{(1)}$ determined in association with the sub-vectors of information symbols that are associated with block levels $k=1, \ldots, N-1$ lower than the lowest block level equal to N associated with the selected candidate sub-vector $\hat{s}_1^{(N)}$ such that:

$$m(\hat{s}) = \sum_{k=1}^{N} m(\hat{s}_1^{(k)}) \quad (17)$$

The second processor 305 may be further configured to store the determined candidate vector $\hat{s}$ in a second stack 307 together with the cumulated decoding metric $m(\hat{s})$.

Advantageously, the parallelized recursive block decoding further enables an online update of the decoding metric threshold from the cumulated decoding metrics associated with the determined candidate vectors. Accordingly, a processor among the two or more processors comprised in the decoder 300 may be configured to order the first stack 310 according to a given order (increasing or decreasing) of the decoding metrics associated with the stored candidate sub-vectors and to update the decoding metric threshold $m_{th}$ to the cumulated decoding metric $m(\hat{s})$ associated with the candidate vector $\hat{s}$ such that $m_{th} = m(\hat{s})$. This processor may be further configured to remove from the first stack 310 the candidate sub-vectors that are associated with a decoding metric that is higher than the updated decoding metric threshold.

The online update of the decoding metric threshold may be performed by the second processor 305 or by a third processor 306 comprised in the decoder 300, the third processor 306 being activated each time a candidate vector $\hat{s}$ is found. In an application to hard-output decoding, the third processor 306 may be configured to determine/deliver an estimate of the vector of information symbols from the candidate vector stored in the stack that is associated with the lowest cumulated decoding metric.

In an application to soft-output decoding, the third processor 306 may be configured to use the candidate vectors stored in the second stack 307 to calculate the log likelihood ratio values for approximating the extrinsic information of the different information bits carried by the original information symbols.

The decoder 300 may further comprise a real-to-complex converter 308 configured to deliver a complex-value vector $\hat{s}_c$ as an estimate of the original vector of complex-value symbols $s_c$. Then, the obtained candidate vector $\hat{s}$ may be converted into the complex-value vector $\hat{s}_c = [\hat{s}_1, \hat{s}_2, \ldots, \hat{s}_{n/2}]^t$ such that a component $\hat{s}_j$ for $j=1, \ldots, n/2$ is given by:

$$\hat{s}_j = (\hat{s})_j + i(\hat{s})_{j+n/2} \quad (18)$$

In equation (18), $(u)_j$ denotes the $j^{th}$ element of a vector u.

According to some embodiments, a symbol estimation algorithms $D^{(k)}$ may be selected from one or more symbol estimation algorithms previously determined or loaded from storage means.

According to some embodiments, the symbol estimation algorithm(s) $D^{(k)}$ for $k=1, \ldots, N$ may be previously determined, depending on a signal-to-noise ratio and/or on the computational capabilities of devices or systems implementing the parallelized recursive block decoding and/or on the outage capacity of the transmission channel. Further, the symbol estimation algorithm(s) $D^{(k)}$ for $k=1, \ldots, N$ may be previously determined depending on a target quality of service metric that is required such as a target achievable transmission rate.

According to one embodiment, the symbol estimation algorithms $D^{(k)}$ may be similar.

According to another embodiment, the symbol estimation algorithms $D^{(k)}$ may be different.

In some embodiments, a symbol estimation algorithm $D^{(k)}$ for $k=1, \ldots, N$ may be chosen in the group comprising a sequential decoding algorithm, a linear decoding algorithm such as the ZF or the MMSE decoders, or a non-linear ZF-DFE decoder.

In an embodiment in which a sequential decoding algorithm is used in a given sub-block $(SB)_k$, the corresponding symbol estimation algorithm $D^{(k)}$ may deliver an estimate $\hat{s}^{(k)}$ by minimizing the block metric $m(s^{(k)})=\|\tilde{y}^{(k)}-R^{(k)}s^{(k)}\|^2 \leq m_{th}$ according to:

$$\hat{s}^{(k)} = \operatorname{argmin}_{s^{(k)} \in A^{l_k}} m(s^{(k)}) = \operatorname*{argmin}_{s^{(k)} \in A^{l_k}} \|\tilde{y}^{(k)} - R^{(k)} s^{(k)}\|^2 \qquad (19)$$

Sequential decoding algorithms such as the Sphere Decoder (SD), the Stack decoder and the SB-Stack decoder (SB-Stack), may be used to solve equation (19).

Further, in some embodiments a preprocessing on the upper triangular sub-matrices $R^{(k)}$ may be performed prior to the estimation of the candidate sub-vector using for example a lattice reduction and/or an MMSE-GDFE filtering.

Figure 4:
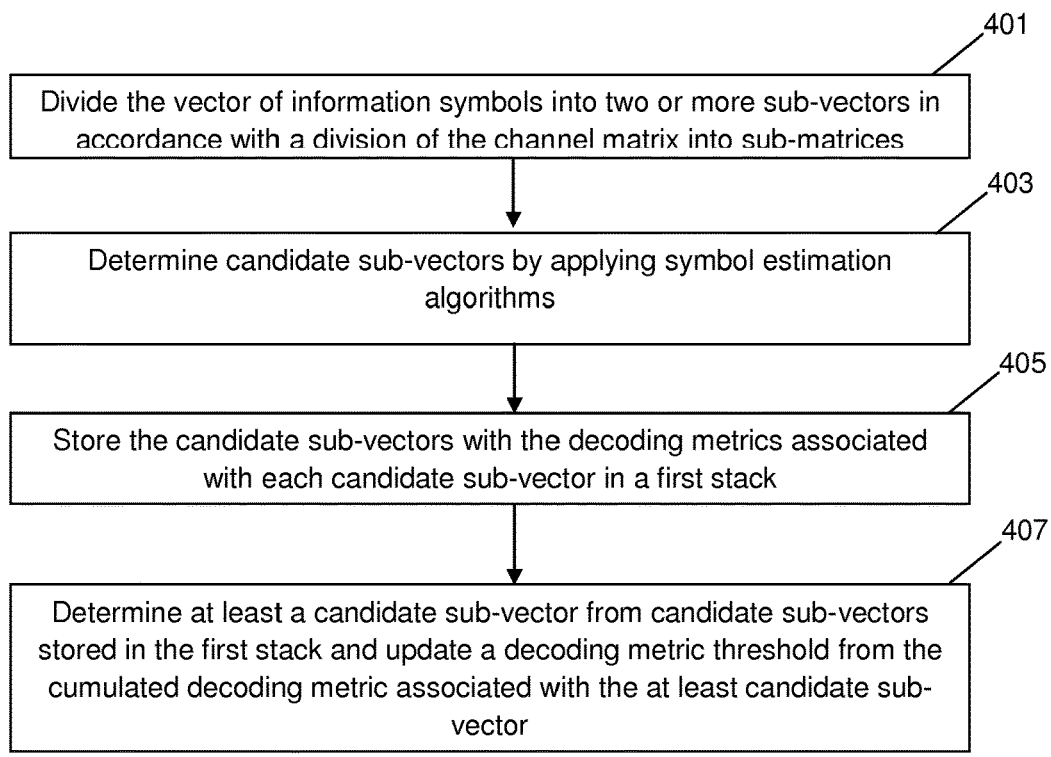
FIG. 4 is a flowchart depicting a method of parallelized recursive block decoding, according to some embodiments.

Referring to FIG. 4, there is also provided a method for determining an estimate of a vector of information symbols carried by a signal, the signal being received through a transmission channel represented by a channel matrix. The received signal may be written in a real-value system according to equation (6) and equivalently represented using the QR decomposition as expressed in equation (7).

At step 401, a division of the vector of information symbols $\tilde{y}$ into two or more sub-vectors of information symbols may be performed in accordance with a division of the channel matrix R into sub-matrices. The vector $\tilde{y}$ may be accordingly divided into $N \geq 2$ sub-vectors such that $$\tilde{y} = \begin{bmatrix} \tilde{y}^{(1)} \\ \vdots \\ \tilde{y}^{(N)} \end{bmatrix},$$

the sub-vector $\tilde{y}^{(k)}$ of index k, for k=1, . . . , N has a lengths $l_k \geq 1$. The upper triangular matrix R may be divided into two or more sub-matrices according to equation (10).

At step 403, sets of candidate sub-vectors denoted by $\Gamma_1, \ldots, \Gamma_N$ may be determined by applying symbol estimation algorithms such that the set $\Gamma_k$ comprises one or more candidate sub-vectors $\hat{s}_1^{(k)}, \ldots, \hat{s}_{Card(\Gamma_k)}^{(k)}$ of the $k^{th}$ sub-vector of information symbol $s^{(k)}$, with $Card(\Gamma_k)$ designating the cardinality of the set $\Gamma_k$ strictly inferior to the cardinality of the alphabet A to which belong the real and imaginary parts of the complex-value vector of information symbols. The sets of candidate sub-vectors may be determined by two or more processors operating in parallel. The step 403 of determining candidate sub-vectors may comprise a sub-step for determining, by each of the two or more processors, at least a candidate sub-vector by applying a symbol estimation algorithm, a candidate sub-vector representing an estimate of a sub-vector of information symbols.

At step 405, at least a candidate sub-vector of information symbols may be stored in a first stack with a decoding metric and the block level representing the level of the candidate sub-vector within the channel matrix R, the decoding metric being lower than or equal to a decoding metric threshold.

At step 407, at least a candidate vector may be determined from the candidate sub-vectors stored in the first stack, the candidate vector representing an estimate of the vector of information symbols and being associated with a cumulated decoding metric determined from the decoding metrics stored with the candidate sub-vectors and updating the decoding metric threshold from the cumulated decoding metric.

The methods and devices described herein may be implemented by various means, for example in hardware, software, or a combination thereof. In a hardware implementation, the processing elements of the decoder 300 can be implemented for example according to a hardware-only configuration (for example, in one or more FPGA, ASIC or VLSI integrated circuits with the corresponding memory) or according to a configuration using both VLSI and DSP.

Figure 5:
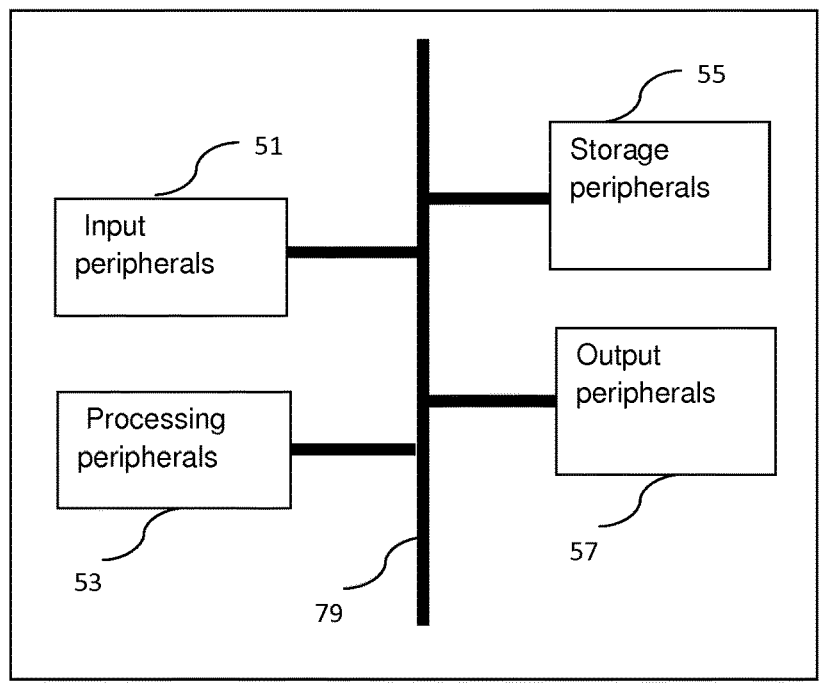
FIG. 5 illustrates a hardware architecture of a Space-Time decoder according to some embodiments.

FIG. 5 represents an exemplary hardware architecture of the decoder 300, according to some embodiments of the invention. The hardware architecture may be implemented in a machine or computer executed device. As illustrated, the decoder 300 may include various computing, storage and communication units possibly interacting with each another through a data and address port 59 and comprising:

Input peripherals 51 for receiving for example input data from the receive antennas;

Processing peripherals 53 comprising one or more microprocessors (CPU) such as an FPGA or an ASIC configured for instance to execute the corresponding instructions to run the methods and algorithms according to the embodiments of the invention;

Storage peripherals 55 possibly comprising a random access memory (RAM) or a read-only memory to store for example the first stack and the second stack comprising the candidate sub-vectors of information symbols and the candidate vectors of information symbols, and Output peripherals 57 comprising communication means such as displays enabling for example man-to-machine interaction between the receiver device 21 and a MIMO system administrator for configuration and maintenance purposes.

Although the embodiments of the invention have been described manly with reference to symmetric MIMO configurations characterized by a same number of transmit and receive antennas, it should be noted that the invention may also be applied to asymmetric MIMO configurations with $n_t < n_r$. A linear representation in the form of equation (6) can also be obtained by performing the complex-to-real conversion of step 601 to the equivalent system given by:

$$U^\dagger y_c = DV^\dagger s_c + U^\dagger w_c \qquad (20)$$

In equation (20), the matrices U and V are unitary matrices obtained, together with matrix D, from the singular value decomposition of the matrix $H_c = UDV^t$. D is a diagonal matrix having positive diagonal entries representing the singular values of the matrix $H_c$. The superscript $(.)^\dagger$ designates the Hermitian transposition operator.

Further, while some embodiments of the invention have been described in relation to a wireless single-user MIMO system, it should be noted that the invention is not limited to such an application. The invention may be integrated in any receiver device operating in any linear communication system characterized by a linear representation of the channel output. The communication system may be wired, wireless or optical fiber-based accommodating single or multiple users, using single or multiple antennas, and single or multi-carrier communication techniques. For example, the present invention may be integrated in a receiver device implemented in a wireless distributed MIMO system. Distributed MIMO may be used for example in cellular communications applied in 3G, 4G, LTE, and future 5G standard or the like. Cooperative communications applied for example in ad-hoc networks (wireless sensor networks, machine-to-machine communications, internet of things (IoT), etc) are also examples of distributed MIMO systems. In addition to wireless networks, the present invention may be integrated in optical receiver devices implemented in optical fiber-based communication systems, such as Polarization Division Multiplexing-OFDM (PDM-OFDM) systems.

Further, the invention is not limited to communication devices and may be integrated into signal processing devices such as electronic filters of finite impulse response (FIR) used in audio applications like audio crossovers and audio mastering. Accordingly, some embodiments may be used to determine an estimate of an input sequence, given an output sequence of a FIR filter of order M.

In another application, methods, devices and computer program products according to some embodiments of the invention may be implemented in a Global Navigation Satellite System (GNSS), such as IRNSS, Beidou, GLONASS, Galileo; GPS comprising for instance at least a GPS receiver for estimating positioning parameters using for example carrier phase measurements.

Further, methods, devices and computer program products according to some embodiments of the invention may be implemented in cryptographic systems for determining estimates on private secret values used in a cryptographic algorithm for encrypting/decrypting data or messages during their storage, processing or communication. In lattice-based cryptography applications, data/messages are encrypted in the form of lattice points. The decryption of such encrypted data may be advantageously performed according to some embodiments of the invention, enabling for a high probability of success recovery of secret values with a reduced complexity.

Furthermore, the methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such details. Additional advantages and modifications will readily appear to those skilled in the art. The invention in its broader aspects is therefore not limited to the specific details, representative methods, and illustrative examples shown and described.

The invention claimed is:

1. A decoder for determining an estimate of a vector of information symbols carried by a signal, said signal being received through a transmission channel represented by a channel matrix, wherein the decoder comprises:
a block division unit configured to divide said vector of information symbols into two or more sub-vectors of information symbols in accordance with a division of said channel matrix into sub-matrices, each sub-vector being associated with a block level representing a level of said sub-vector in said channel matrix;
two or more processors configured to operate in parallel for determining candidate sub-vectors and storing said candidate sub-vectors in a first stack, each of said two or more processors being configured to determine at least a candidate sub-vector by applying a symbol estimation algorithm, a candidate sub-vector representing an estimate of a sub-vector of information symbols and to store said at least a candidate sub-vector of information symbols in said first stack with a decoding metric and the block level representing the level of said candidate sub-vector within said channel matrix, said decoding metric being lower than or equal to a decoding metric threshold, a processor among said two or more processors being configured to determine at least a candidate vector from candidate sub-vectors stored in said first stack, said candidate vector representing an estimate of said vector of information symbols and being associated with a cumulated decoding metric determined from the decoding metrics stored with said candidate sub-vectors and to update said decoding metric threshold from said cumulated decoding metric.

2. The decoder of claim 1, wherein the two or more processors comprise:
a first processor configured to determine one or more candidate sub-vectors in association with each sub-vector of information symbols by recursively applying an estimation algorithm starting from the sub-vectors of information symbols associated with the highest block level until reaching the sub-vector of information symbols associated with the lowest block level, the first processor being configured to store each candidate sub-vector in said first stack;
a second processor configured to determine one or more candidate sub-vectors by recursively selecting a sub-vector in the first stack associated with the lowest block level and determining a candidate sub-vector in association with each of the sub-vectors of information symbols that are associated with block levels lower than said lowest block level by applying a symbol estimation algorithm until reaching the lowest block level in the channel matrix, the second processor being further configured to determine a candidate vector from the selected candidate sub-vector and the candidate sub-vectors determined in association with the sub-vectors of information symbols that are associated with block levels lower than said lowest block level, said candidate vector representing an estimate of said vector of information symbols, the second processor being further configured to determine a cumulated metric associated with said candidate vector by adding the decoding metrics associated with said selected candidate sub-vector and the decoding metrics associated with the candidate sub-vectors determined in association with the sub-vectors of information symbols that are associated with block levels lower than said lowest block level, the second processor being configured to store said candidate vector in a second stack with said cumulated decoding metric, said decoding metric threshold being updated to said cumulated decoding metric.

3. The decoder of claim 2, wherein a processor among said two or more processors is configured to:
order the first stack according to a given order of the decoding metrics associated with the candidate sub-vectors, update said decoding metric threshold to said cumulated decoding metric associated with said candidate vector,
remove from said first stack the candidate sub-vectors that are associated with a decoding metric higher than the updated decoding metric threshold, and
determine an estimate of a vector of information symbols from the candidate vector stored in the second stack that is associated with the lowest cumulated decoding metric.

4. The decoder of claim 1, wherein said symbol estimation algorithm is chosen in a group comprising a sequential lattice decoding algorithm, a Zero Forcing algorithm, a Minimum Mean Square Error algorithm, and a Zero Forcing Decision Feedback Equalizer.

5. The decoder of claim 4, wherein said symbol estimation algorithm comprises a preprocessing step using a lattice reduction algorithm and/or an MMSE-GDFE filtering.

6. The decoder of claim 1, wherein said symbol estimation algorithm is previously determined depending on a signal-to-noise ratio and/or on an outage capacity.

7. The decoder of claim 1, wherein said symbol estimation algorithm is previously determined depending on a target quality of service metric chosen in a group comprising a target achievable transmission rate.

8. The decoder of claim 1, wherein said block division unit is configured to divide said vector of information symbols according to a set of division parameters comprising a number of blocks at least equal to two and block lengths, said number of blocks representing the number of said sub-vectors of information symbols, a block length representing a number of information symbols comprised in a sub-vector of information symbols.

9. A method for determining an estimate of a vector of information symbols carried by a signal, said signal being received through a transmission channel represented by a channel matrix, wherein the method comprises:

dividing said vector of information symbols into two or more sub-vectors of information symbols in accordance with a division of said channel matrix into sub-matrices, each sub-vector being associated with a block level representing a level of said sub-vector in said channel matrix;

determining, by two or more processors operating in parallel, candidate sub-vectors and storing said candidate sub-vectors in a first stack, the step of determining candidate sub-vectors comprising:

determining, by each of said two or more processors, at least a candidate sub-vector by applying a symbol estimation algorithm, a candidate sub-vector representing an estimate of a sub-vector of information symbols and, storing said at least a candidate sub-vector of information symbols in said first stack with a decoding metric and the block level representing the level of said candidate sub-vector within said channel matrix, said decoding metric being lower than or equal to a decoding metric threshold, the method further comprises determining at least a candidate vector from candidate sub-vectors stored in said first stack, said candidate vector representing an estimate of said vector of information symbols and being associated with a cumulated decoding metric determined from the decoding metrics stored with said candidate sub-vectors and updating said decoding metric threshold from said cumulated decoding metric.

* * * * *